Aug. 21, 1956

P. J. H. JANSSEN 2,760,110

CIRCUIT-ARRANGEMENT FOR PRODUCING
SAWTOOTH CURRENT ACROSS A COIL
Filed July 22, 1952

INVENTOR
PETER JOHANNES HUBERTUS JANSSEN
BY
Fred M Vogel
AGENT

United States Patent Office 2,760,110
Patented Aug. 21, 1956

2,760,110

CIRCUIT-ARRANGEMENT FOR PRODUCING SAW-TOOTH CURRENT ACROSS A COIL

Peter Johannes Hubertus Janssen, Eindhoven, Netherlands, assignor to Hartford National Bank and Trust Company, Hartford, Conn., as trustee Application July 22, 1952, Serial No. 300,156

Claims priority, application Netherlands August 31, 1951

4 Claims. (Cl. 315—27)

The invention relates to a circuit-arrangement for producing a sawtooth current across a coil and more particularly to a circuit-arrangement comprising a screen-grid tube, the anode circuit of which includes the series combination of the primary winding of a transformer, a capacitor and an anode supply, the voltage of which is lower than the required screen-grid voltage. The coil is connected to a secondary winding of the transformer, the capacitor being charged with the use of a rectifying circuit during the stroke of the sawtooth current, the capacitor voltage increasing the anode supply voltage.

The main object of the present invention is to provide means to supply voltage to the screen grid of the tube in such circuit-arrangements in a most simple and economical manner.

If, as is the case with most known circuit-arrangements comprising a booster diode, the voltage of the anode supply is high, the screen-grid voltage may be taken from this source in a known manner.

However, if use is made of a source, the voltage of which is lower than the required screen-grid voltage, the screen grid could be fed from the combined source formed by the supply and the capacitor. In this case, the resultant voltage is usually too high, so that a resistor must be included in the supply lead to the screen grid. In this resistor, however, a comparatively great amount of energy is lost.

The correct screen-grid voltage could, as an alternative, be obtained with the use of a separate rectifier, a capacitor and an auxiliary winding of the transformer, which, however, is rather costly.

The circuit-arrangement according to the invention obviates this limitation and is characterized in that the voltage across a secondary winding of the transformer is supplied to the screen grid.

Consequently, in this case, use is made of the fact that during the stroke of the sawtooth current a substantially constant voltage occurs across such a winding, so that during the stroke, with correct choice of the polarity the screen-grid voltage can be given its correct value.

The screen-grid voltage is then strongly reduced during the fly-back of the sawtooth current, it is true, but this is not objectionable, since the screen-grid tube must then be cut off.

This reduction of the screen-grid voltage during the fly-back is even advantageous, since as a consequence the control voltage for the screen-grid tube can then be a sawtooth voltage, since the negative peak voltage which otherwise must be used and supplied to the control grid, in addition to the sawtooth voltage in order to cut off the tube during the fly-back, need not be supplied now at the control-grid of the tube.

It should be noted for the safe of completeness that it is known per se to cut off a discharge tube during the fly-back, if the output circuit of this tube comprises a deflection coil connected via a transformer and supplying it to the collecting grid of the tube. No provision is made in this connection, however, for feeding of the screen grid.

With a preferred embodiment of the circuit-arrangement according to the invention the screen-grid voltage is derived from the voltage across the coil.

Thus, at the same time, the interference oscillations that may occur at the beginning of the stroke of the sawtooth current are damped owing to the internal resistance of the cathode-screen grid space of the tube, which resistance is low at this instant.

In order that the invention may be more clearly understood and readily carried into effect, it will now be described more fully with reference to the accompanying drawing, in which.

Figure 1:
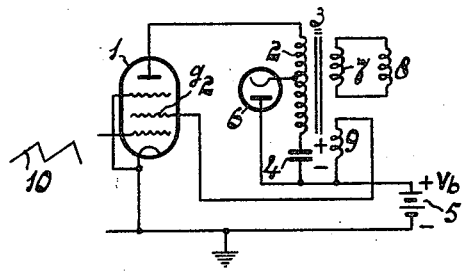
Fig. 1 shows schematically one embodiment of the circuit-arrangement according to the invention.

Referring to Fig. 1, the anode circuit of the screen-grid tube 1 comprises the series combination of the primary winding 2 of a transformer 3, a capacitor 4 and the anode supply 5, having a voltage $V_b$.

The cathode of a diode 6 is connected to a tap on the winding 1 and the anode of the diode 6 is connected to the positive terminal of the battery 5.

The negative terminal of the battery is connected to the cathode of the tube 1 and also to ground.

To the secondary winding 7 of the transformer 3 is connected a coil 8.

One end of an addition secondary winding 9 of the transformer 3 is connected to the positive terminal of the battery 5 and the other end of this winding is connected to the screen-grid $g_2$ of the tube 1.

A sawtooth voltage 10 is supplied to the control-grid of the tube 1.

Apart from the feeding of the screen-grid $g_2$, the operation of the circuit-arrangement is known.

For the sake of clearness it should be noted that with such a circuit-arrangement the diode 6 is conductive during the stroke of the sawtooth current, so that a voltage having the polarity indicated in the figure is produced across the capacitor 4, this voltage increasing the operative supply voltage for the anode of the tube 1.

At the screen grid a voltage $Vg_2$ occurs, which is the sum of the voltage across the winding 9 and the battery voltage.

Figure 2:
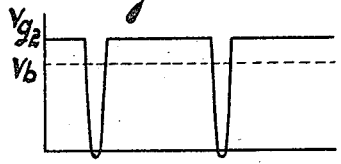
Fig. 2 shows the variation of the screen-grid voltages as a function of time.

The variation of the screen-grid voltage $Vg_2$ is plotted in Figure 2 as a function of time $t$.

In this figure the horizontal broken line represents the battery voltage $V_b$.

During the stroke of the sawtooth current the voltage $Vg_2$ exceeds the battery voltage $V_b$ exactly by the amount required for the correct operation of the circuit-arrangement.

During the fly-back the voltage $Vg_2$ is, however, much lower than the battery voltage and the total voltage usually becomes even negative, so that the tube 1 is cut off.

Figure 3:
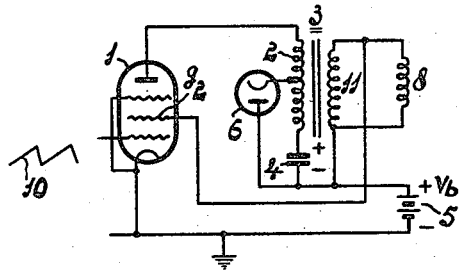
Fig. 3 shows a modified form of the circuit-arrangement according to the invention.

With the circuit-arrangement shown in Figure 3 the parts corresponding to those shown in Fig. 1 are designated by the same reference numerals.

The circuit-arrangement is distinguished from that shown in Figure 1 only as far as the transformer 3 comprises only a single secondary winding 11, to which both the coil 8 and the screen grid $g_2$ are connected.

If the voltage across the coil 8 should become slightly too high, the parallel combination of a resistor and a capacitor may be included in series in the screen-grid lead, which insertion gives rise to relatively little dissipation.

What I claim is:

1. A circuit-arrangement for causing a sawtooth current to flow through a coil, comprising an electron discharge tube having a cathode, a control electrode, a screen grid and an anode, a transformer having a primary and a secondary winding, a capacitor connected to an end of said primary winding, means connected to apply a positive potential relative to cathode to said anode through said capacitor in series with said primary winding, a rectifier connected across the series combination of said capacitor and a portion of said primary winding, means to apply a sawtooth voltage to said control electrode said secondary winding being connected to said coil, and direct-current conductive means connected to apply a positive potential relative to cathode to said screen grid through said secondary winding to apply to said screen grid both said last-named positive potential and the alternating voltage developed in said secondary winding.

2. A circuit-arrangement for causing a sawtooth current to flow through a coil, comprising an electron discharge tube having a cathode, a grid, a screen grid and an anode, a transformer having a primary and a secondary winding, a capacitor connected at one terminal thereof to an end of said primary winding, an anode voltage source having its negative terminal connected to said cathode and its positive terminal connected to the remaining terminal of said capacitor, a connection between said primary winding and said anode, a diode having a cathode connected to a point in said primary winding and an anode connected to said positive terminal, means to apply a sawtooth voltage to said grid, and direct-current conductive means for connecting said secondary winding between said positive terminal and said screen grid to apply to said screen grid both the voltage from said positive terminal and the alternating voltage developed in said secondary winding.

3. A circuit-arrangement as claimed in claim 2, including an additional secondary winding positioned on said transformer and connected to said coil.

4. A circuit-arrangement as claimed in claim 2, including means for connecting said secondary winding to said coil.

References Cited in the file of this patent

UNITED STATES PATENTS

| | | |
|---|---|---|
| 2,262,630 | Bahring | Nov. 11, 1941 |
| 2,284,378 | Dome | May 26, 1942 |
| 2,449,969 | Wright | Sept. 28, 1948 |
| 2,459,187 | Schlesinger | Jan. 18, 1949 |
| 2,589,299 | Setchell | Mar. 18, 1952 |
| 2,590,836 | Andrew | Apr. 1, 1952 |
| 2,627,052 | Helpert et al. | Jan. 27, 1953 |